United States Patent [19]

Maeda et al.

[11] Patent Number: 4,861,835
[45] Date of Patent: Aug. 29, 1989

[54] POLYMER BLEND COMPOSITION SUITABLE AS OPTICAL MATERIAL

[75] Inventors: Kazuhiko Maeda, Tokyo; Taku Yamauchi, Kamifukuoka; Toshio Koishi, Sakado, all of Japan

[73] Assignee: Central Glass Company, Limited, Ube, Japan

[21] Appl. No.: 136,714

[22] Filed: Dec. 22, 1987

[30] Foreign Application Priority Data

Dec. 23, 1986 [JP] Japan ................ 61-305279

[51] Int. Cl.$^4$ ................ C08L 27/18; G02B 6/16
[52] U.S. Cl. ................ 525/200; 525/199; 525/185; 525/153; 428/394; 350/96.29
[58] Field of Search ............. 525/153, 185, 199, 200

[56] References Cited

U.S. PATENT DOCUMENTS

| | | | |
|---|---|---|---|
| 4,591,616 | 5/1986 | Miyata et al. | 525/185 |
| 4,617,350 | 10/1986 | Maeda et al. | 525/200 |
| 4,731,417 | 3/1988 | Miyata et al. | 525/200 |

FOREIGN PATENT DOCUMENTS 59-41348  3/1984  Japan .
59-62657  4/1984  Japan .

*Primary Examiner*—John C. Bleutge
*Assistant Examiner*—Susan Berman
*Attorney, Agent, or Firm*—Fleit, Jacobson, Cohn, Price, Holman & Stern

[57] ABSTRACT

A polymer blend of 2–80 wt % of an acrylic or methacrylic ester base polymer and the balance of a ternary copolymer of vinylidene fluoride (VDF), hexafluoroacetone (HFA) and tetrafluoroethylene (TFE) is very high in transparency and serves as a thermoplastic resin useful for optical purposes. The first polymer of the blend can be selected from homopolymers and copolymers of $C_1$–$C_4$ alkyl acrylates and methacrylates. The second polymer is preferably made up of 2–15 mol % of HFA, 5–60 mol % of TFE and the balance of VDF. The polymer blend has a relatively low index of refraction, which can be controlled by selecting the first and second polymers and/or by varying the blending ratio. The polymer blend is soluble in various organic solvents. Besides, the polymer blend serves as a thermochromic material that becomes opaque by heating and resumes transparency by cooling.

10 Claims, 1 Drawing Sheet

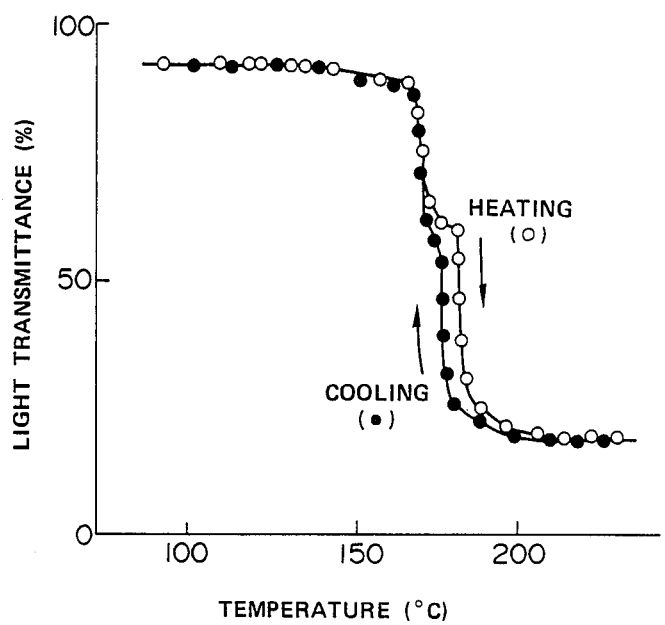

POLYMER BLEND COMPOSITION SUITABLE AS OPTICAL MATERIAL

BACKGROUND OF THE INVENTION

This invention relates to a polymer blend composition which is comprised of a vinylidene fluoride base copolymer and an acrylic or methacrylic ester polymer and is suitable for use as an optical material.

With the rapid advance of optical and optoelectronic devices there is an increasing demand for light transmitting plastics.

For optical fibers used in the current optical communication systems the principal materials are quartz glass and inorganic multicomponent glass. Plastics optical fibers have been developed mainly for display and short-distance transmission purposes. In general the core material of plastics optical fibers is an acrylic or methacrylic resin represented by polymethyl methacrylate and the cladding material is selected from rather special fluororesins. Besides, recently increasing attention is paid to so-called polymer cladded optical fibers using an inorganic glass as the core material and a fluororesin as the cladding material.

Advantages of plastics optical fibers reside in good flexibility or pliability and ease of fabrication and processing. Since conventional plastics optical fibers are larger in transmission loss than inorganic glass optical fibers, still there is a keen demand for Plastics having improved transparency and refractive characteristics.

Thus far, optical fibers using plastics are mostly of the step-index type. At present efforts are devoted also to the development of optical plastic materials of the graded-index type for use not only in optical fibers but also in other optical elements such as cylindrical lenses. As optical materials, fluororesins are highly valued because of their inherently low refractivity by the effect of the atomic refraction of fluorine. One way to desirably control the refractive index of plastics is blending two kinds of polymers or copolymers different in refractivity. However, not many kinds of practicable optical materials have been obtained by this technique. The main reason for low availability of this method is because two kinds of polymers having very different indices of refraction are in most cases poor in compatibility or mutual solubility so that blend of such two polymers becomes low in mechanical strength and also in transparency.

According to JP-A No. 59-41348, a polymer blend of polymethyl methacrylate, or a copolymer of methyl methacrylate and another methacrylate or acrylate, and a copolymer of vinylidene fluoride and tetrafluoroethylene is good in mutual solubility and serves for optical purposes. According to JP-A No. 59-62657, similarly good mutual solubility is exhibited also when a copolymer of vinylidene fluoride and trifluoroethylene is used in place of the copolymer in JP-A No. 59-41348. However, these polymer blends are not fully satisfactory in transparency and are liable to partially crystallize at elevated temperatures. U.S. Pat. Nos. 4,591,616 and 4,617,350 show polymer blends of a binary copolymer of vinylidene fluoride and hexafluoroacetone with a methyl methacrylate base polymer or an acrylate base polymer. As disclosed in these patents, mutual solubility between a vinylidene fluoride base polymer and an acrylate or methacrylate base polymer is improved by incorporating hexafluoroacetone in the former polymer, and the polymer blends of these patents are improved in transparency too. However, still there is a demand for plastics having more improved transparency together with other properties required for optical materials.

SUMMARY OF THE INVENTION

It is an object of the present invention to provide a polymer blend composition which is high in transparency and low in crystallinity and also in refractivity and possesses good mechanical properties for use as a thermoplastic optical material.

It is another object of the invention to provide a polymer blend composition which is useful as either an optical material or a thermochromic material.

The present invention provides a polymer blend composition consisting essentially of a blend of 2–80% by weight of a first polymer, which is an acrylic or methacrylic ester base polymer, and a second polymer which is a ternary copolymer of vinylidene fluoride, hexafluoroacetone and tetrafluoroethylene.

In a polymer blend according to the invention it is preferred that the ternary copolymer (second polymer) is made up of 2–15 mol % of hexafluoroacetone (HFA), 5–60 mol % of tetrafluoroethylene (TFE) and the balance of vinylidene fluoride (VDF). Also it is preferred that the first polymer is an alkyl acrylate or methacrylate base polymer in which each alkyl group has 1 to 4 carbon atoms. The first polymer may be either a homopolymer or a copolymer.

The VDF-HFA-TFE ternary copolymer employed in this invention is very good in mutual solubility with acrylic or methacrylic ester base polymers over a wide range of blending ratio. This ternary copolymer is very low in crystallinity: it scarcely exhibits a melting peak by analysis with DSC (differential scanning calorimeter). This copolymer is excellent in transparency, low in refractive index, good in flexibility and pliability and very low in tackiness. In other VDF base copolymers it is often found that heating for molding extruding or any other purpose causes coloration of the copolymers by reason of liberation of hydrogen fluoride. However, in the herein employed ternary copolymer such coloration is greatly reduced by virtue of copolymerizing TFE.

The polymer blend compositions according to the invention belong to thermoplastic resins which can easily be molded, extruded or otherwise shaped into various forms and, like other fluororesins, are excellent in heat resistance, chemical resistance and weather resistance and relatively low in refractivity. Moreover, the polymer blend compositions are excellent in transparency, and the refractivity of the polymer blend can be controlled over a fairly wide range by controlling the proportion of the first polymer to the second polymer and/or proportions of the three components of the second polymer and also by selecting the alkyl group of the monomer(s) of the first polymer.

By utilizing excellent transparency and controllable indices of refraction, the compositions according to the invention can be used for various light transmitting devices and optical circuit elements such as optical fibers of the graded-index type, cladding of optical fibers of the step-index type and plastics lenses including cylindrical lenses. Besides, the same compositions can be used as transparent adhesives, which have controlled indices of refraction and are especially suited for use in optical devices, by utilizing good adhesive property of the acrylic or methacrylic ester base polymers and good solubilities of the polymer blend compositions in various organic solvents. Furthermore, solutions of the same compositions can provide coating films or paint films excellent in weatherability.

As another important merit of the invention, it is possible to use a polymer blend of the invention as a thermochromic material. That is, in many cases a blend of the aforementioned first and second polymers has a transition temperature above which the two components of the polymer blend lose mutual solubility so that the blend becomes opaque, and as the temperature is lowered the blend returns to the homogeneous and transparent state. Examples of known thermochromic materials are spiropyrans, pianthrones, imidazollines and some azo compounds. In the cases of these thermochromic materials it is impossible to arbitrarily determine the thermochromic transition temperature, and these materials are not high in durability for repeated operations. As thermochromic materials polymer blends according to the invention possess good durability, and it is easy to variously set the thermochromic transition temperature by selecting the proportions of the two polymers, molecular weight of each polymer, composition of the VDF-HFA-TFE ternary copolymer and/or alkyl group of the acrylate or methacrylate monomer(s) of the first polymer.

BRIEF DESCRIPTION OF THE DRAWING

The single FIG. is a graph showing the relationship between temperature and light transmittance of an example of a polymer blend according to the invention.

DESCRIPTION OF THE PREFERRED EMBODIMENTS

In this invention the first polymer is preferably selected from polyalkyl acrylates, polyalkyl methacryaltes and copolymers comprising at least one alkyl acrylate or methacrylate as a major component. In any case it is preferable that the alkyl group of the acrylate or methacrylate monomer(s) have 1 to 4 carbon atoms. That is, preferred monomers are methyl acrylate, methyl methacrylate, ethyl acrylate, ethyl methacrylate, n-propyl acrylate, n-propyl methacrylate, isopropyl acrylate, isopropyl methacrylate, n-butyl acrylate and n-butyl methacrylate. In the case of using a copolymer, the copolymer is not required to be made up of exclusively acrylates and/or methacrylates and may optionally include a kind of vinylic monomer which serves the purpose of improving certain properties of the copolymer.

A ternary copolymer of VDF, HFA and TFE for use in this invention can be prepared by radical copolymerization of the three monomers in an organic solvent using an oil-soluble initiator. In the ternary copolymer the amount of HFA is limited within the range from 2 to 15 mol %, and the amount of TFE within the range from 5 to 60 mol %. If HFA amounts to more than 15 mol % the yield of the copolymerization reaction lowers greatly. If the amount of TFE is less than 5 mol % the copolymer is not fully satisfactory in transparency. If TFE amounts to more than 60 mol % the copolymer becomes relatively low in transparency and, furthermore, becomes worse in mutual solubility with acrylic or methacrylic ester polymers so that the resultant polymer blend compositions cannot always be molded or extruded into transparent bodies.

To fully accomplish the objects of the invention it is necessary that an acrylic or methacrylic base polymer (first polymer) occupies 2–80 wt % of the polymer blend. The remaining part of the polymer blend must be the above described VDF-HFA-TFE copolymer (second polymer).

Blending of the first and second polymers and shaping of the polymer blend can be accomplished by any method that is applicable to conventional thermoplastic resins. For example, the two polymers are blended and kneaded under appropriate heating in a conventional mixer such as Henschel mixer, V-type blender, ribbon blender or planetary mixer, and the obtained blend composition is shaped into a desired by using a conventional method such as extrusion, injection molding, calendering or press-shaping. In the shaping operation it is suitable to keep the polymer blend composition heated at 80°–300° C., and preferably at 150°–250° C., depending on the kinds of the blended polymers and the blending ratio. A solution blending method is also practicable since there are many kinds of organic solvents in which both the first and second polymers are well soluble. Examples of such solvents are dimethylacetamide, dimethylformamide, acetonitrile, tetrahydrofuran, acetone, methylethyl ketone, methylisobutyl ketone, ethyl acetate and butyl acetate. The blending is accomplished by the steps of dissolving both polymers in a selected solvent, stirring the solution for blending well, pouring the solution into either water or a suitable organic liquid such as methanol to precipitate the polymer blend and drying the precipitate. It is also possible to obtain a very transparent cast film of the polymer blend composition by spreading a mixed solution of the first and second polymers in an organic solvent on a glass plate or an alternative substrate and then evaporating the solvent.

As a favorable characteristic of a VDF-HFA-TFE copolymer used in this invention, the copolymer itself is soluble in many kinds of acrylic or methacrylic ester monomers. Therefore, it is possible to accomplish preparation of an acrylic or methacrylic ester base polymer and blending of the polymer with VDF-HFA-TFE copolymer simultaneously. That is, a polymer blend according to the invention is obtained by first dissolving a VDF-HFA-TFE copolymer in a selected alkyl acrylate or methacrylate monomer and, after adding a radical polymerization initiator, keeping the solution heated under stirring until completion of polymerization of the acrylate or methacrylate. In such a case it is also possible to cause polymerization of the acrylate or methacrylate by photopolymerization with ultraviolet rays.

The invention is further illustrated by the following nonlimitative examples.

EXAMPLE 1

As the first polymer for blending, polymethyl methacrylate (PMMA) was prepared by a usual radical polymerization method using benzoyl peroxide as initiator. For use as the second polymer, three kinds of VDF-HFA-TFE copolymers were prepared by a usual radical polymerization method using heptafluorobutyryl peroxide as initiator. In the respective copolymers the proportions of VDF, HFA and TFE, by mol, were as shown in Table 1.

The PMMA was blended with each of the three VDF-HFA-TFE copolymers in three different proportions, viz. 10:90, 40:60 and 70:30 by weight. In every case blending was made by the following method.

Predetermined quantities of PMM and the selected VDF-HFA-TFE copolymer were dissolved in methylisobutyl ketone to obtain a solution in which the total concentration of the polymers was 2-5 wt %, and the solution was stirred for 2 hr at room temperature. Then the solution was poured into a mixture of water and methanol to cause precipitation of a blend of PMMA and the VDF-HFA-TFE copolymer, and the precipitate was washed and dried.

Each of the thus prepared nine kinds of polymer blends was press-shaped at 180°-220° C. by application of a pressure of 200 kg/cm² into a sheet having a thickness of 1 mm. Every polymer blend sheet was transparent to the naked eye, and measurement of light transmittance gave the results shown in Table 1. The refractive index ($n_D^{20}$) of every polymer blend sheet was measured with Abbe's refractometer Type 2. The result is shown in Table 1

TABLE 1

| 1st Polymer | 2nd Polymer | Blend Ratio | Light Transmittance (%) 570 nm | 780 nm | Refractive Index ($n_D^{20}$) |
|---|---|---|---|---|---|
| PMMA | P(VDF-HFA-TFE) (80/5/15) | 10/90 | 91 | 92 | 1.399 |
|  |  | 40/60 | 92 | 92 | 1.430 |
|  |  | 70/30 | 93 | 92 | 1.461 |
| PMMA | P(VDF-HFA-TFE) (70/9/21) | 10/90 | 93 | 92 | 1.393 |
|  |  | 40/60 | 93 | 91 | 1.425 |
|  |  | 70/30 | 94 | 92 | 1.458 |
| PMMA | P(VDF-HFA-TFE) (51/12/37) | 10/90 | 89 | 89 | 1.388 |
|  |  | 40/60 | 91 | 90 | 1.422 |
|  |  | 70/30 | 92 | 90 | 1.454 |

EXAMPLE 2

For use as the first polymer in this invention, polyethyl methacrylate (PEMA), polymethyl acrylate (PMA) and a copolymer of 50 mol % of methyl methacrylate (MMA) and 50 mol % of n-butyl acrylate (nBA) were prepared each by a usual radical polymerization method using benzoyl peroxide as initiator.

Each of the above PEMA, PMA and P(MMA-bBA) was blended with the second VDF-HFA-TFE copolymer (70/9/21) used in Example 1 in three different proportions, viz. 10:90, 40:60 and 70:30 by weight, by the same method as in Example 1. Each polymer blend was press-shaped at 160°-220° C. into a sheet having a thickness of 1 mm by application of a pressure of 200 kg/cm².

On the thus prepared nine kinds of polymer blend sheets, measurement of light transmittance gave the results shown in Table 2. The 40/60 blend of PEMA and P(VDF-HFA-TFE) was subjected to thermal analysis with DSC. No melting peak appeared in the DSC chart, so that existence of no crystalline phase in the polymer blend was confirmed. Thermal decomposition of this polymer blend began at 380° C.

TABLE 2

| 1st Polymer | 2nd Polymer | Blend Ratio | Light Transmittance (%) 570 nm | 780 nm |
|---|---|---|---|---|
| PEMA | P(VDF-HFA-TFE) (70/9/21) | 10/90 | 93 | 93 |
|  |  | 40/60 | 94 | 94 |
|  |  | 70/30 | 94 | 92 |
| PMA | P(VDF-HFA-TFE) (70/9/21) | 10/90 | 91 | 92 |
|  |  | 40/60 | 92 | 92 |
|  |  | 70/30 | 94 | 93 |
| P(MMA-nBA) | P(VDF-HFA-TFE) (70/9/21) | 10/90 | 88 | 89 |
|  |  | 40/60 | 87 | 91 |
|  |  | 70/30 | 91 | 90 |

EXAMPLE 3

The 70/9/21 VDF-HFA-TFE copolymer used in Example 2 was dissolved in ethyl methacrylate monomer refined by distillation so as to obtain 25 wt % solution of the ternary copolymer. As a radical polymerization initiator 0.5 wt % of benzoyl peroxide was dissolved in the solution. The solution was put into a glass reaction tube having an inner diameter of 10 mm, and the gas atmosphere in the apparatus including the reaction tube was completely replaced by introgen gas. After that the solution in the tube was kept heated at 80° C. for 5 hr to thereby accomplish polymerization of ethyl methacrylate. As the result the solution turned into a transparent solid cylinder formed of a blend of PEMA with the VDF-HFA-TFE copolymer.

An about 1 mm thick disc was cut out of the obtained cylinder, and the disc was polished. The refractive index ($n_D^{20}$) of this disc was 1.463. Light transmittance of the same disc was 94% for wavelength of 570 nm and 93% for wavelength of 780 nm.

EXAMPLE 4

PMMA and the 70/9/21 VDF-HFA-TFE copolymer were blended at blending ratio of 50:50 by weight by dissolving both polymers in methylisobutyl ketone so as to obtain a solution in which the total content of the polymers was 5 wt %. The solution was applied to a glass substrate by a spin coating method, and the coating film was dried at 90° C. for 15 min to thereby obtain a cast film (thickness 10 μm) of the polymer blend.

The film of the polymer blend was heated so as to gradually raise the temperature, and transmittance of the film for white light was measured at various temperatures. As shown in the FIG., the transmittance sharply lowered as the temperature of the film was raised beyond about 165° C. so that the film became opaque. After heating up to about 250° C., the film was allowed to cool down and light transmittance of the cooling film was measured at various temperatures. As can be seen in the FIG., the change in transmittance was reversible so that the film returned to the initial transparent state by cooling. Thus, the tested polymer blend proved itself a thermochromic material.

What is claimed is:

1. A polymer blend composition, consisting essentially of a blend of 2-80 wt % of a first polymer, which is an acrylic or methacrylic ester base polymer, and the balance of a second polymer which is a ternary copolymer of 2-5 mol % of hexafluoroacetone, 5-60 mol % of tetrafluoroethylene and the balance of vinylidene fluoride.

2. A composition according to claim 1, wherein said first polymer is an alkyl acrylate or methacrylate base polymer in which each alkyl group has not more than 4 carbon atoms.

3. A composition according to claim 2, wherein said first polymer is a homopolymer.

4. A composition according to claim 2, wherein said first polymer is a copolymer of at least two kinds of vinylic monomers at least one of which is an alkyl acrylate or methacrylate.

5. A composition according to claim 1 wherein said first polymer is polymethyl methacrylate.

6. A composition according to claim 1, wherein said first polymer is polymethyl acrylate.

7. A composition according to claim 1, wherein said first polymer is polyethyl methacrylate.

8. A composition according to claim 1 wherein said first polymer is a copolymer of methyl methacrylate and n-butyl acrylate.

9. A composition according to claim 1, wherein said blend is solidified from a melt of a mixture of said first and second polymers.

10. A composition according to claim 1, wherein said blend is solidified from a solution of said first and second polymers in an organic solvent by removal of said solvent.

* * * * *